United States Patent Office 3,714,165
Patented Jan. 30, 1973

3,714,165
AMINO-PYRIMIDINE DERIVATIVES AND
THEIR PREPARATION
Albert H. Beaufour, 56 Avenue de Suffren, 75 Paris 15eme, France, and Jean A. Renault, 17 Rue de Sevres, 75 Paris 6eme, France
No Drawing. Filed Mar. 9, 1970, Ser. No. 17,930
Claims priority, application Great Britain, Apr. 3, 1969, 17,557/69
Int. Cl. C07d 51/42
U.S. Cl. 260—256.4 N
17 Claims

ABSTRACT OF THE DISCLOSURE

Amino-pyrimidine derivatives of the formula

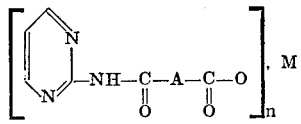

are disclosed, which compounds possess an anti-depressant or psychostimulant activity and wherein A represents
 (1) an alkylene chain having up to 16 carbon atoms, or
 (2) a lower alkylene chain substituted by:
  amino, or
  a lower alkanoyl amino having from 2 to 5 carbon atoms.
M represents H, Na, Ca or an organic basic ammonium salt.
$n$ is an integer equal to the valence of M.

---

The present invention relates to amino-pyrimidine derivatives. More particularly the invention relates to amino-pyrimidine derivatives having the following formula:

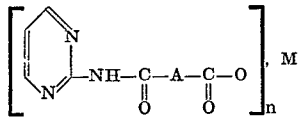

wherein

A represents
 (1) an alkylene chain having up to 16 carbon atoms such as methylene, ethylene, propylene, butylene, pentylene, hexylene, heptylene, octylene, nonylene, undecylene, dodecylene, tridecylene, tetradecylene, pentadecylene, hexadecylene, or
 (2) a lower alkylene chain substituted by:
  amino or
  a lower alkanoyl amino having from 2 to 5 carbon atoms such as acetyl, propionyl, butyryl, pentanoyl,
M represents H, Na, K, NH$_4$, Mg, Ca or an organic basic ammonium salt namely a cysteamine or gamma-guanidine butyramide addition salt.
$n$ is an integer equal to the valence of M.

The compounds of the present invention have been found to possess interesting therapeutic activity particularly in the psychotropic field wherein the compounds have been found to possess unexpected antidepressant or psychostimulant activities. The products are administered in the conventional dosage forms.

There is also provided a process for preparing the amino-pyrimidine derivatives of the present invention which comprises reacting a 2-amino pyrimidine with a di-acid of the formula

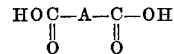

wherein A is as previously defined, or an anhydride thereof, in a solvent such as a ketone, dioxan or pyridine. When the di-acid is used, di-cyclohexylcarbodiimide is necessary and the reaction is carried out at about 0° C. When the corresponding acid anhydride is used, the reacting mixture is refluxed for some hours. Both methods operate satisfactorily but the first one, more expensive, is used either when the appropriate acid anhydride is not available or when optically active isomers exist and only one of the isomeric forms is desired.

For the preparation of Na, K, NH$_4$, Ca, Mg and amine salts, the acid thus obtained is reacted with the appropriate hydroxide or amine in an appropriate solvent.

This invention will be more fully illustrated by the following examples:

Example 1.—N-(2-pyrimidinyl)succinamic acid

Into a three-necked flask fitted with a stirrer and reflux condenser are poured 0.75 l. of methyl isobutyl ketone, 95 g. of 2-amino-pyrimidine (1 mol) and 100 g. (1 mol) of succinic anhydride. The mixture is boiled under reflux for 5 hours (oil bath at 155° C.) and allowed to cool. A precipitate appears and is separated by filtration, washed with acetone, dried and dissolved in a 10% aqueous solution of sodium bicarbonate. The solution is then treated by 300 ml. of 10% hydrochloric acid. A new precipitate appears, is separated and dried. Recrystallisation is carried out with the mixture of ethyl and methyl (60%) alcohols. The resulting melting point is 180° C. (with one mol of water).

The sodium salt of 2-amino pyrimidine monosuccinamide is obtained by reacting 2-amino pyrimidine monosuccinamide with NaOH in stoichiometric proportions. By proceeding in the same manner and replacing the succinic anhydride with butane-1,4-dicarboxylic anhydride there will be obtained the corresponding 5(pyrimidine-2-ylcarbamoyl)pentanoic acid.

Example 2.—N-(2-pyrimidine)glutaramic acid

Using the same technique as in Example 1, this compound is prepared from 95 g. of 2-amino-pyrimidine (1 mol) and 100 g. of glutaric anhydride (1 mol) dissolved in 1 litre of dioxan. Recrystallisation is from ethanol. The melting point is 172° C.

The potassium salt of 2-amino pyrimidine monoglutaramide is obtained by reacting 2-amino pyrimidine monogluaramide with KOH in stoichometric proportions. By proceeding in the same manner and replacing the glutaric anhydride with hexane-1,6-dicarboxylic anhydride there will be obtained the corresponding 7-(pyrimidine-2-ylcarbamoyl)heptanoic acid.

Example 3.—(d,l)-4-acetylamino 4-(pyrimidin-2-ylcarbamoyl) butyric acid

Using the same technique as in Example 2, this compound is prepared from 47.5 g. (0.5 mol) of 2-amino-pyrimidine and 85.5 g. (0.5 mol) of N-acetylglutamic anhydride dissolved in 1 litre of dioxan. Recrystallization from methyl alcohol. Melting point 204° C. The racemic form is obtained.

The ammonium salt of 2-amino-pyrimidine-mono-N-acetyl-α-amino-glutaramide is obtained by reacting 2-amino - pyrimidine - mono-N-acetyl-α-amino-glutaramide with NH$_4$OH in stoichiometric proportions. By proceeding in the same manner and replacing the N-acetyl glutamic anhydride with octane-1,8-dicarboxylic anhydride there will be obtained the corresponding 9-(pyrimidin-2-yl-carbamoyl)-nonanoic acid.

Example 4.—9-(pyrimidin-2-yl-carbamoyl)-nonanoic acid

This compound is obtained by reacting 40.4 g. of sebacic acid (0.2 mol) dissolved in 200 ml. of pyridine on 9.5 g. of 2-amino-pyrimidine (0.1 mol) in presence of 20.6 g. of dicyclohexylcarbodiimide (0.1 mol) at about 0° C. After elimination of the dicyclohexylurea and evaporation of the pyridine, the treatment is the same as in the preceding examples. The melting point is about 130° C. (irregular melting).

The calcium salt of 2-amino-pyrimidine monosebacamide is obtained by reacting 2-amino-pyrimidine mono-sebacamide with $Ca(OH)_2$ in stoichiometric proportions. By proceeding in the same manner and replacing the sebacic acid with decane-1,10-dicarboxylic acid there will be obtained the corresponding 11-(pyrimidin-2-yl-carbamoyl) undecanoic acid.

Example 5.—5-(1)-4-acetylamino (pyrimidin-2-yl-carbamoyl) butyric acid

The technique described in Example 4 is applied for the obtention of the laevo rotatory form of the compound of Example 3. 56.8 g. (0.3 mol) of (1)-N-acetylglutamic acid are used with 19 g. (0.2 mol) of 2-amino-pyrimidine and 41.2 g. (0.2 mol) of dicyclohexylcarbodiimide. Recrystallization in methyl alcohol. Melting point 212° C.

The magnesium salt of 2-amino-pyrimidine mono-N-acetyl-α-amino-glutaramide is obtained by reacting 2-amino-pyrimidine mono - N - acetyl-α-amino-glutaramide with $Mg(OH)_2$ in stoichiometric proportions. By proceeding in the same manner and replacing the N-acetylglutamic acid with dodecane-1,12-dicarboxylic acid there will be obtained the corresponding 13-(pyrimidin-2-yl-carbamoyl) terdecanoic acid.

When starting with the N-propionylglutamic acid or the N-butyrylglutamic acid or the N-pentanyl glutamic acid and proceeding in the same manner there are obtained the corresponding (1)-4-propionylamino-4(pyrimidin-2-yl-carbamoyl) butyric acid,
(1)-4-butyrylamino-4-(pyrimidin-2-yl-carbamoyl) butyric acid or
(1)-4-pentanoylamino-4 (pyrimidin-2-yl)-carbamoyl butyric acid.

By proceeding in the same manner and replacing the N-acetylglutamic acid with tetradecane-1,14-dicarboxylic acid there will be obtained the corresponding 15-(pyrimidin-2-yl-carbamoyl) pentadecanoic acid.

By proceeding in the same manner and replacing the N-acetylglutamic acid with hexadecane-1,16-dicarboxylic acid there will be obtained the corresponding 17-(pyrimidin-2-yl-carbamoyl) heptadecanoic acid.

Example 6.—Cysteamine, N-(2-pyrimidinyl) succinamate

The compound of Example 1 is suspended in ethanol and a stoichiometric amount of cysteamine dissolved in ethanol is added under stirring. Then the mixture is refluxed for half an hour and stirring is maintained for 12 hours at room temperature. A precipitate is separated, recrystallized in monomethylic ether of ethylene glycol. Yield 71%. Melting point 192° C. The analysis shows the correspondence with the formula $C_{12}H_{16}O_3N_4S$.

Theory (percent): C, 44.10; H, 5.92; O, 17.62; N, 20.57; S, 11.77. Found (percent): C, 44.24; H, 5.75; O, 17.84; N, 20.43; S, 11.61.

Example 7.—Cysteamine, N-(2-pyrimidinyl) glutaramate

Using the technique of Example 6 with 41.8 g. (0.2 mol) of 2-amino-pyrimidine monoglutaramide in 50 ml. of ethanol and 15.4 g. (0.2 mol) of cysteamine in 100 ml. of ethanol, there are obtained, after recrystallization in ethanol-methanol (50:50), 43 g. of a compound melting at 178/180° C. The analysis shows the correspondence with the formula $C_{11}H_{18}O_3N_4S$.

Theory (percent): C, 46.13; H, 6.34; O, 16.76; N, 19.57; S, 11.19. Found (percent): C, 46.13; H, 6.03; O, 17.03; N, 19.57; S, 11.03.

Example 8.—Cysteamine, (1)-4-acetylamino-4-(pyrimidin 2-yl-carbamoyl) butyrate

The compound of Example 5 is treated by cysteamine according to the technique described in Example 6. The analysis corresponds with the formula $C_{13}H_{21}O_4N_5S$.

Theory (percent): C, 45.47; H, 6.16; O, 18.64; N, 20.39; S, 9.34. Found (percent): C, 45.32; H, 6.25; O, 18.72; N, 20.35; S, 9.36.

Example 9.—Gamma-guanidino butyramide, N-(2-pyrimidinyl) glutaramate

The process described in Example 6 was applied to the compound of Example 2 and γ-guanidino butyramide; however, as the latter compound is on the form of its hydrochloride, a corresponding amount of NaOH in alcoholic solution is added for the neutralization of hydrochloric acid.

In a ten litres reactor are poured 3 l. of monomethylic ether of ethylene glycol, 52.2 g. (0.25 mol) of 2-amino-pyrimidine monoglutaramide and 10 g. (0.25 mol) of NaOH tablets dissolved in 0.3 l. of ethanol. There is then added under stirring a solution of 45 g. (0.25 mol) of γ-guanidino butyramide hydrochloride in 0.25 l. of monomethylic ether of ethylene glycol. The mixture is refluxed for half an hour and allowed to cool 12 hours after filtration (elimination of impurities). The solution is evaporated to dryness which gives a white pasty product. After washing by acetone there is obtained a white precipitate which is dried. Yield 91 g. Melting point 160/162° C. Its composition corresponds with the formula $C_{14}H_{23}O_4N_7$. This precipitate is recrystallized in ethanol.

Theory (percent): C, 47.58; H, 6.56; O, 18.11; N, 27.75. Found (percent): C, 47.49; H, 6.64; O, 18.23; N, 27.64.

Example 10.—Gamma-guanidino butyramide N-(2-pyrimidinyl) succinamate

The same technique as in Example 9 was used with the compound of Example 1 instead of the compound of Example 2.

It was obtained a compound melting at 184/186° C. composition of which corresponds with the formula $C_{13}H_{21}O_4N_7 \cdot 0.5H_2O$ and which is recrystallized in methanol (90%) and water.

Theory (percent): C, 44.82; H, 6.37; O, 28.14; N, 20.67. Found (percent): C, 44.72; H, 6.18; O, 28.10; N, 21.38.

We claim:

1. An amino-pyrimidine derivative of the following formula

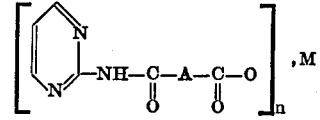

wherein

A represents
(1) an alkylene chain having up to 16 carbon atoms such as methylene, ethylene, propylene, butylene, pentylene, hexylene, heptylene, octylene, nonylene, undecylene, dodecylene, tridecylene, tetradecylene, pentadecylene, hexadecylene; or
(2) a lower alkylene chain substituted by:
   amino; or
   an alkanoyl amino having from 2 to 5 carbon atoms wherein the alkanoyl portion is selected from acetyl, propionyl, butyryl, pentanoyl, M represents H, Na, K, NH₄, Mg, Ca or cysteamine or gamma guanidine butyramide addition salt.

n is an integer equal to the valence of M.

2. A compound of claim 1 wherein A represents an alkylene chain having up to 16 carbon atoms.

3. A compound of claim 1 wherein A represents a lower alkylene chain substituted by amino.

4. A compound of claim 1 wherein A represents a lower alkylene chain substituted by a lower acylamino having from 2 to 5 carbon atoms.

5. A compound of claim 2 wherein M represents hydrogen and n represents 1.

6. A compound of claim 3 wherein M represents hydrogen and n represents 1.

7. A compound of claim 4 wherein M represents hydrogen and n represents 1.

8. The compound of claim 1 which is N-(2-pyrimidinyl) succinamic acid.

9. The compound of claim 1 which is N-(2-pyrimidinyl) glutaramic acid.

10. The compound of claim 1 which is (d,l)-4-acetyl-amino-4-(pyrimidine-2-yl-carbamoyl) butyric acid.

11. The compound of claim 1 which is 9-(pyrimidine-2-yl-carbamoyl)-nonanoic acid.

12. The compound of claim 1 which is (l)-4-acetyl-amino-(pyrimidin-2-yl-carbamoyl) butyric acid.

13. The compound of claim 1 which is cysteamin, N-(2-pyrimidinyl) succinamate.

14. The compound of claim 1 which is cysteamin, N-(2-pyrimidinyl) glutaramate.

15. The compound of claim 1 which is cysteamin, (1) 4-acetylamino-4-(pyrimidin-2-yl-carbamoyl) butyrate.

16. The compound of claim 1 which is gamma-guanidino butyramide. N-(2-pyrimidinyl) glutaramate.

17. The compound of claim 1 which is gamma-guanidino butyramide, N-(2-pyrimidinyl) succinamate.

References Cited

Shirley et al., C.A. 47, 3814c (1953).

NICHOLAS S. RIZZO, Primary Examiner

R. V. RUSH, Assistant Examiner

U.S. Cl. X.R.

260—999